(12) United States Patent
Iwaki et al.

(10) Patent No.: US 10,675,847 B2
(45) Date of Patent: Jun. 9, 2020

(54) ADHESIVE COMPOSITION, AND SEAL STRUCTURE BODY AND METHOD FOR MANUFACTURING THE SAME

(71) Applicant: NIPPON VALQUA INDUSTRIES, LTD., Tokyo (JP)

(72) Inventors: Masamichi Iwaki, Gojo (JP); Naoki Osumi, Gojo (JP)

(73) Assignee: VALQUA, LTD., Tokyo (JP)

( * ) Notice: Subject to any disclaimer, the term of this patent is extended or adjusted under 35 U.S.C. 154(b) by 0 days.

(21) Appl. No.: 15/570,562

(22) PCT Filed: Apr. 27, 2016

(86) PCT No.: PCT/JP2016/063213
§ 371 (c)(1),
(2) Date: Oct. 30, 2017

(87) PCT Pub. No.: WO2016/178396
PCT Pub. Date: Nov. 10, 2016

(65) Prior Publication Data
US 2018/0126712 A1 May 10, 2018

(30) Foreign Application Priority Data

May 1, 2015 (JP) ................................. 2015-093950

(51) Int. Cl.
*B32B 27/30* (2006.01)
*B32B 15/082* (2006.01)
(Continued)

(52) U.S. Cl.
CPC ............ *B32B 27/304* (2013.01); *B32B 15/08* (2013.01); *B32B 15/082* (2013.01); *B32B 27/30* (2013.01);
(Continued)

(58) Field of Classification Search
CPC .................................................. C09D 201/04
See application file for complete search history.

(56) References Cited

U.S. PATENT DOCUMENTS

| | | | |
|---|---|---|---|
| 5,194,543 A | 3/1993 | Schlipf et al. | |
| 5,478,652 A * | 12/1995 | Grootaert | C08K 5/136 |
| | | | 428/422 |

(Continued)

FOREIGN PATENT DOCUMENTS

| | | |
|---|---|---|
| CN | 1653114 A | 8/2005 |
| CN | 1659028 A | 8/2005 |

(Continued)

OTHER PUBLICATIONS

International Search Report dated Jun. 14, 2016, issued in counterpart International Application No. PCT/JP2016/063213 (2 pages).

(Continued)

*Primary Examiner* — Ian A Rummel
(74) *Attorney, Agent, or Firm* — Westerman, Hattori, Daniels & Adrian, LLP

(57) ABSTRACT

An adhesive composition includes a coupling agent composed of a compound having a first functional group that reacts with an inorganic material and a second functional group that reacts with an organic material, and a crosslinking agent capable of crosslinking with a crosslinking site of a fluorine-based elastomer. A seal structure body includes a metallic support, fluorine-based elastomer and adhesive composition that causes fluorine-based elastomer to adhere to metallic support. A method for manufacturing seal structure body includes the steps of providing metallic support and fluorine-based elastomer, and causing fluorine-based elastomer to adhere to metallic support by using adhesive composition. Accordingly, an adhesive composition with high adhesion strength as well as a seal structure body and (Continued)

a method for manufacturing the same are provided at low cost.

7 Claims, 1 Drawing Sheet

(51) Int. Cl.
*C09D 201/04* (2006.01)
*C09J 11/06* (2006.01)
*C09K 5/00* (2006.01)
*C08F 14/18* (2006.01)
*B32B 15/08* (2006.01)
*C09D 201/00* (2006.01)
*C08K 5/23* (2006.01)
*C09J 127/18* (2006.01)
*C09J 201/00* (2006.01)
*C09K 3/10* (2006.01)
*C08K 5/00* (2006.01)

(52) U.S. Cl.
CPC .......... *C08F 14/185* (2013.01); *C08K 5/0025* (2013.01); *C08K 5/23* (2013.01); *C09D 201/00* (2013.01); *C09D 201/04* (2013.01); *C09J 11/06* (2013.01); *C09J 127/18* (2013.01); *C09J 201/00* (2013.01); *C09K 3/10* (2013.01)

(56) References Cited

U.S. PATENT DOCUMENTS

| | | |
|---|---|---|
| 6,518,366 B1 | 2/2003 | Irie et al. |
| 2003/0073786 A1* | 4/2003 | Irie ........................ C08F 8/00 525/326.2 |
| 2003/0207118 A1* | 11/2003 | Fukushi ................ B32B 7/12 428/421 |
| 2003/0225189 A1 | 12/2003 | Fuller |
| 2004/0122182 A1 | 6/2004 | Kawasaki et al. |
| 2008/0064820 A1 | 3/2008 | Kawasaki et al. |

FOREIGN PATENT DOCUMENTS

| | | |
|---|---|---|
| EP | 0 491 287 A1 | 6/1992 |
| EP | 1 842 889 A1 | 10/2007 |
| JP | 7-145244 A | 6/1995 |
| JP | 8-134422 A | 5/1996 |
| JP | 2005-524748 A | 8/2005 |
| JP | 2007-277340 A | 10/2007 |
| TW | I237653 B | 8/2005 |
| WO | 00/29479 A1 | 5/2000 |
| WO | 00/59959 A1 | 10/2000 |
| WO | 2011/071984 A2 | 6/2011 |

OTHER PUBLICATIONS

Office Action dated Mar. 27, 2019, issued in counterpart TW application No. 105113561, with English translation. (9 pages).
Office Action dated Dec. 26, 2018., issued in counterpart Chinese Application No. 201680025147.3, with English translation (16 pages).
Office Action dated Dec. 10, 2019, issued in counterpart JP Application No. 2015-093950, with English translation (5 pages).
Office Action dated Jan. 14, 2020, issued in counterpart CN Application No. 201680025147.3, with English translation (6 pages).
"The Technology Encyclopaedia of Synthetic Resin and Plastics", Sinopec-Press, Apr. 2006, (1411-1412 pages); Cited in CN Office Action dated Jan. 14, 2020.

* cited by examiner

ADHESIVE COMPOSITION, AND SEAL STRUCTURE BODY AND METHOD FOR MANUFACTURING THE SAME

TECHNICAL FIELD

The present invention relates to an adhesive composition used for adhesion of a fluorine-based elastomer as well as a seal structure body including the fluorine-based elastomer and the adhesive composition, and the method for manufacturing the same.

BACKGROUND ART

For a plasma etching apparatus, a plasma CVD (chemical vapor deposition) apparatus and the like that are used for manufacturing a semiconductor device, a fluorine-based elastomer excellent in heat resistance and plasma resistance among elastomers has been used as a seal material for maintaining a process chamber in which a semiconductor wafer is treated vacuum.

At a gate part that separates a process chamber and a transfer chamber of the plasma etching apparatus, the plasma CVD apparatus and the like, a gate valve having a seal structure body in which a seal material is attached to a metallic support is provided, and transfer and treatment of the semiconductor wafer are repeated by opening and closing the gate valve.

Among gate valves, there is a gate valve of a seal material engaging type, in which a groove is formed on a metallic support such as aluminum and a seal material is fitted into the groove. The gate valve of the seal material engaging type has problems of torsion of the seal material, falling of the seal material from the groove, and the like. Accordingly, a gate valve of a seal material adhesion type where a seal material is adhered to a metallic support is suitably used. For the gate valve of the seal material adhesion type, an adhesive composition having a high adhesive property between the metallic support and the seal material is required to be capable of withstanding the repeated opening and closing.

In particular, when a perfluoroelastomer (FFKM) that has the highest heat resistance and plasma resistance among fluorine-based elastomers is used as a seal material, the perfluoroelastomer has a poor adhesive property with a metallic support since carbon atoms of side chains constituting the perfluoroelastomer are fully fluorinated. Accordingly, an adhesive composition having a high adhesive property between the metallic support and the perfluoroelastomer that is the seal material is required.

As an adhesive composition that causes a perfluoroelastomer that is an organic material to adhere to a metallic support that is an inorganic material, a coupling agent such as a silane coupling agent has been known. However, it is difficult to increase the adhesive property between the metallic support and the perfluoroelastomer only by the silane coupling agent.

Then, Japanese Patent Laying-Open No. 2007-277340 (PTD 1) discloses, as an adhesive composition having a high adhesive property between a metallic support and a perfluoroelastomer, a vulcanizing adhesive composition obtained by compounding 50 to 400 parts by weight of a silane coupling agent and 50 to 400 parts by weight of an organometallic compound to 100 parts by weight of a phenolic resin.

In addition. International Publication No. WO 2011/071984 (PTD 2) discloses, as an adhesive composition having a high adhesive property between a metallic support and a perfluoroelastomer, a primer composition including a curative, a solvent and an epoxy resin; wherein the curative is capable of reacting with the epoxy resin; and further wherein; (a) the curative is capable of curing a perfluoroelastomer compound having at least one curing site and a crosslinking agent or catalyst; or (b) when the curative is not capable of curing the perfluoroelastomer compound, the perfluoroelastomer includes a crosslinking agent or catalyst capable of curing the epoxy resin.

CITATION LIST

Patent Document

PTD 1: Japanese Patent Laying-Open No. 2007-277340
PTD 2: International Publication No. WO 2011/071984

SUMMARY OF INVENTION

Technical Problems

The vulcanizing adhesive composition disclosed in Japanese Patent Laying-Open No. 2007-277340 (PTD 1) has problems that a metallic element in the organometallic compound becomes a cause of particles in a semiconductor device, that the vulcanizing adhesive composition has high reactivity and is difficult to handle and that the vulcanizing adhesive composition requires a high cost.

In addition, the primer composition disclosed in International Publication No. WO 2011/071984 (PTD 2) requires baking treatment in order for the primer composition to fix after being applied on the metallic support, and there has been a problem that the primer composition has low adhesive strength.

Then, an object of the present invention is to solve the above-described problems and to provide an adhesive composition that does not contain an organometallic compound, is easy to handle, does not require baking treatment and has high adhesion strength at low cost, as well as a seal structure body and a method for manufacturing the same.

Solutions to Problems

The present invention includes the following adhesive composition as well as the seal structure body and the method for manufacturing the same.

[1] An adhesive composition including a coupling agent composed of a compound having a first functional group that reacts with an inorganic material and a second functional group that reacts with an organic material, and a crosslinking agent capable of crosslinking with a crosslinking site of a fluorine-based elastomer.

[2] The adhesive composition according to the item [1], wherein the above-described compound of the above-described coupling agent further has a silicon atom and the above-described coupling agent is a silane coupling agent.

[3] The adhesive composition according to the item [1] or [2], wherein the above-described crosslinking agent is a crosslinking agent of at least one system of an oxazole crosslinking system, a thiazole crosslinking system and an imidazole crosslinking system.

[4] The adhesive composition according to any one of the items [1] to [3], wherein the above-described fluorine-based elastomer is a perfluoroelastomer.

[5] The adhesive composition according to the item [4], wherein the above-described perfluoroelastomer contains a nitrile group (CN group) as the crosslinking site.

[6] A seal structure body including a metallic support, a fluorine-based elastomer and the adhesive composition according to any one of the items [1] to [5] that causes the above-described fluorine-based elastomer to adhere to the above-described metallic support.

[7] A method for manufacturing a seal structure body, the method including the steps of: providing a metallic support and a fluorine-based elastomer; and causing the above-described fluorine-based elastomer to adhere to the above-described metallic support by using the adhesive composition according to any one of the items [1] to [5].

Advantageous Effects of Invention

According to the present invention, it is possible to provide an adhesive composition having high adhesion strength that does not contain an organometallic compound, is easy to handle, and does not require baking treatment at low cost as well as a seal structure body and a method for manufacturing the same.

DESCRIPTION OF EMBODIMENTS

Embodiment 1: Adhesive Composition

Figure 1:
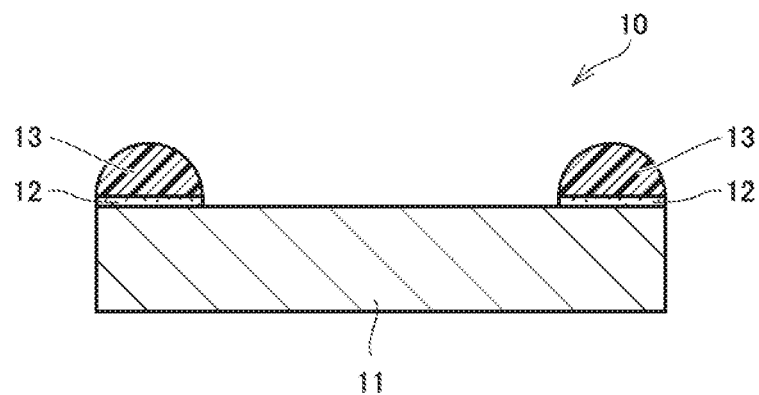
FIG. 1 is an outline cross-section view that shows an example of the seal structure body according to the present invention.
Figure 2:
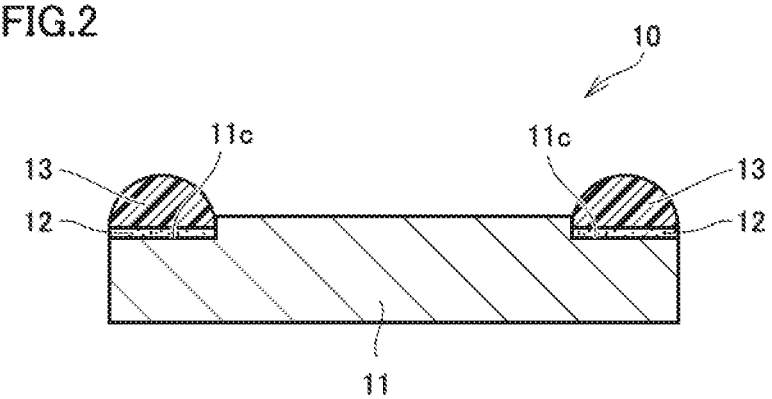
FIG. 2 is an outline cross-section view that shows another example of the seal structure body according to the present invention.

With reference to FIGS. 1 and 2, an adhesive composition 12 that is an embodiment of the present invention includes a coupling agent composed of a compound having a first functional group that reacts with an inorganic material and a second functional group that reacts with an organic material, and a crosslinking agent capable of crosslinking with a crosslinking site of a fluorine-based elastomer 13. With regard to adhesive composition 12 of the present embodiment, the first functional group in the coupling agent reacts with and binds to a metallic support 11 that is an inorganic material, the second functional group reacts with and binds to fluorine-based elastomer 13 that is an organic material, and the crosslinking agent crosslinks with and binds to the crosslinking site of fluorine-based elastomer 13. Accordingly, adhesive composition 12 of the present embodiment does not contain an organometallic compound, is easy to handle and does not require baking treatment. In addition, adhesive composition 12 of the present embodiment is capable of causing fluorine-based elastomer 13 to adhere to metallic support 11 with high adhesive strength. Further, adhesive composition 12 of the present embodiment may contain other additives from the viewpoint of enhancing adhesion stability. Furthermore, adhesive composition 12 of the present embodiment may contain a solvent for dissolving or dispersing the coupling agent, the crosslinking agent and the additive from the viewpoint of enhancing workability.

(Coupling Agent)

The coupling agent contained in adhesive composition 12 of the present embodiment has a first functional group X that reacts with an inorganic material and a second functional group Y that reacts with an organic material. The first functional group X is not particularly limited as long as it is a functional group that reacts with an inorganic material. Examples of the functional group that is hydrolyzed by water to form a hydrogen bond with a hydroxy group (OH group) on a surface of an inorganic material and forms a covalent bond with the inorganic material due to a dehydration condensation reaction caused by drying treatment include an alkoxy group such as a methoxy group ($CH_3O$ group) and an ethoxy group ($C_2H_5O$ group), a halogen group such as a chloro group (Cl group) and a bromo group (Br group) and the like. The second functional group Y is not particularly limited as long as it is a functional group that reacts with an organic material. Examples of the second functional group Y include a vinyl group ($CH_2\!=\!CH$ group), a styryl group ($CH_2\!=\!C_6\!-\!H_5$ group), an epoxy group, a methacrylic group, an acrylic group, an amino group ($NH_2$ group), a ureido group, an isocyanate group ($N\!=\!C\!=\!O$ group), an isocyanurate group, a mercapto group (SH group), a sulfide group, a carbon atom-containing group containing any of these functional groups and the like.

In addition, the above-described coupling agent is not particularly limited, and the above-described coupling agent may be a silane coupling agent that further contains a silicon atom, a titanate coupling agent that further contains a titanium atom or an aluminate coupling agent that further contains an aluminum atom, in addition to the above-described first functional group and the second functional group. It is preferable that the above-described coupling agent is a silane coupling agent that is a coupling agent of which the above-described compound further contains a silicon atom, from the viewpoint of being capable of obtaining adhesive composition 12 having high adhesion strength at low cost.

Examples of the silane coupling agent include vinyltrimethoxysilane, trichlorovinylsilane, p-styryltrimethoxysilane, 2-(3,4-epoxycyclohexyl)ethyltrimethoxysilane, 3-glycidoxypropyltrimethoxysilane, 3-glycidoxypropyhnethyldimethoxysilane 3-glycidoxypropylmethyldiethoxysilane, 3-methacryloxypropyltrimethoxysilane, 3-acryloxypropyltrimethoxysilane, 3-aminopropyltrimethoxysilane, N-2-(aminoethyl)-3-aminopropyltrimethoxysilane, N-phenyl-3-aminopropyltrimethoxysilane, 3-ureidopropyltriethoxysilane, 3-isocyanatopropyltriethoxysilane, tris-(trimethoxysilylpropyl)isocyanurate, 3-mercaptopropyltrimethoxysilane, bis(triethoxysilylpropyl)tetrasulfide and the like.

Here, a content ratio of the coupling agent in adhesive composition 12 is preferably greater than or equal to 1 mass % and less than or equal to 10 mass %, and is more preferably greater than or equal to 8 mass % and less than or equal to 10 mass % to the total of adhesive composition 12 from the viewpoints of preventing the coupling agent from self-polymerizing and of completing the reaction in a short period of time.

The crosslinking agent contained in adhesive composition 12 of the present embodiment is not particularly limited as long as it reacts with the second functional group of the coupling agent and is capable of crosslinking with the crosslinking site of fluorine-based elastomer 13. However, it is preferable that the crosslinking agent is a crosslinking agent of at least one system of an oxazole crosslinking system, a thiazole crosslinking system and an imidazole crosslinking system from the viewpoint of being capable of obtaining an adhesive composition having high adhesion strength due to crosslinking with the crosslinking site of fluorine-based elastomer 13, and in particular, from the viewpoint of being capable of obtaining an adhesive composition having high adhesion strength even though fluorine-based elastomer 13 is a perfluoroelastomer. Here, a crosslinking agent of an oxazole crosslinking system refers to a crosslinking agent that crosslinks fluorine-based elastomer 13 by forming an oxazole ring due to the reaction with a nitrile group, when the crosslinking site of fluorine-based elastomer 13 is a nitrile group. In addition, a crosslinking agent of a thiazole crosslinking system refers to a crosslinking agent that crosslinks fluorine-based elastomer 13 by forming a thiazole ring due to the reaction with a nitrile group, when the crosslinking site of fluorine-based elastomer 13 is a nitrile group. Further, a crosslinking agent of an imidazole crosslinking system refers to a crosslinking agent that crosslinks fluorine-based elastomer 13 by forming an imidazole ring due to the reaction with a nitrile group, when the crosslinking site of fluorine-based elastomer 13 is a nitrile group.

The above-described crosslinking agent of at least one system of the oxazole crosslinking system, the thiazole crosslinking system and the imidazole crosslinking system is described, for example, as the following formula (I).

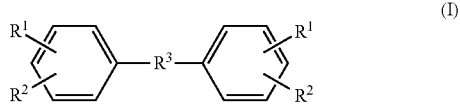

(I)

In the formula (I), $R^3$ is a sulfonyl group ($SO_2$ group), an oxy group (O group), a carbonyl group (C=O group), an alkylene group having 1 to 6 carbon atoms, a perfluoroalkylene group having 1 to 10 carbon atoms, or a carbon-carbon bond that directly binds two benzene rings. In addition, when one of $R^1$ and $R^2$ is an amino group ($NH_2$ group) and the other is a hydroxy group (OH group), the compound is a bis(aminophenol) compound that is a crosslinking agent of the oxazole crosslinking system. Further, when one of $R^1$ and $R^2$ is an amino group ($NH_2$ group) and the other is a mercapto group (SH group), the compound is a bis(aminothiophenol) compound that is a crosslinking agent of the thiazole crosslinking system. Furthermore, when one of $R^1$ and $R^2$ is an amino group ($NH_2$ group) and the other is an amino group ($NH_2$ group) or a substituted amino group (NRH group, $NR_2$ group), the compound is a tetraamine compound. Meanwhile, in the formula (I), $R^1$ and $R^2$ present on the same benzene ring are adjacent to each other, and are present at a meta position or at a para position of the benzene ring with respect to $R^3$.

Suitable examples of the crosslinking agent include 2,2-bis(3-amino-4-hydroxyphenyl)hexafluoropropane (BOAP), 4,4'-sulfonylbis(2-aminophenol)[bis(3-amino-4-hydroxyphenyl)sulfone], 3,3'-diaminobenzidine, 3.3',4,4'-tetraaminobenzophenone and the like.

Here, a content ratio of the crosslinking agent in adhesive composition 12 is preferably greater than or equal to 0.01 mass % and less than or equal to 5 mass %, and is more preferably greater than or equal to 0.1 mass % and less than or equal to 1 mass % to the total of adhesive composition 12 from the viewpoint of enhancing adhesive strength and preventing embrittlement due to the excess addition. In addition, in adhesive composition 12, the crosslinking agent is preferably greater than or equal to 0.1 mass parts and less than or equal to 50 mass parts, and is more preferably greater than or equal to 1 mass part and less than or equal to 10 mass parts, to 100 mass parts of the coupling agent.

Fluorine-based elastomer 13 to which adhesive composition 12 of the present embodiment is used is not particularly limited as long as it has a crosslinking site with which the crosslinking agent contained in adhesive composition 12 is capable of crosslinking. Examples of fluorine-based elastomer 13 include a vinylidene fluoride-hexafluoropropylene (hereinafter also referred to as VDF-HFP) copolymerized elastomer, a vinylidene fluoride-hexafluoropropylene-tetrafluoroethylene (hereinafter also referred to as VDF-HFP-TFE) copolymerized elastomer, a vinylidene fluoride-tetrafluoroethylene-perfluoromethyl vinyl ether (hereinafter also referred to as VDF-TFE-PMVE) copolymerized elastomer, a tetrafluoroethylene-propylene (hereinafter also referred to as TFE-PP) copolymerized elastomer, a tetrafluoroethylene-perfluoroalkyl vinyl ether (hereinafter also referred to as TFE-PAVE) copolymerized elastomer and the like.

In addition, fluorine-based elastomer 13 to which adhesive composition 12 of the present embodiment is used is preferably a tetrafluoroethylene-perfluoroalkyl vinyl ether (hereinafter also referred to as TFE-PAVE) copolymerized elastomer that is a perfluoroelastomer from the viewpoint of having excellent heat resistance and plasma resistance.

In addition, a perfluoroelastomer to which adhesive composition 12 of the present embodiment is used preferably contains a nitrile group (CN group), a halogen group (for example, a bromo (Br) group, a iodo (I) group and the like) and the like, and more preferably contains a nitrile group, as a crosslinking site from the viewpoint of enhancing adhesive strength with metallic support 11. A perfluoroelastomer containing a nitrile group as the crosslinking site forms an oxazole crosslink, a thiazole crosslink and an imidazole crosslink with a crosslinking agent of an oxazole crosslinking system, that of a thiazole crosslinking system and that of an imidazole crosslinking system, respectively, and is capable of forming a strong covalent bond with the crosslinking agent.

Here, specific examples of the perfluoroelastomer containing a nitrile group as the crosslinking site include a perfluoroelastomer composed of tetrafluoroethylene (hereinafter also referred to as TFE), a perfluoroalkyl vinyl ether (hereinafter also referred to as PAVE) and a nitrile group-containing perfluoro monomer (hereinafter also referred to as NPM).

(Additive)

Suitable examples of the additive that may be contained in adhesive composition 12 of the present embodiment include a phenolic resin and the like from the viewpoint of enhancing adhesion stability without lowering adhesive strength of adhesive composition 12.

(Solvent)

Suitable examples of the solvent that may be contained in adhesive composition 12 of the present embodiment include ketones such as acetone, methyl ethyl ketone and methyl isobutyl ketone, alcohols such as methanol, ethanol and isopropanol, esters such as ethyl acetate and propyl acetate, ethers such as ethyl cellosolve, 2-ethoxyethanol and 2-butoxyethanol and the like, from the viewpoint of being capable of dissolving or dispersing the coupling agent, the crosslinking agent and the additive suitably.

Here, an amount of the solvent that may be contained in adhesive composition 12 is not particularly limited, but may be increased or decreased depending on an application method. It is preferable that adhesive composition 12 is from an undiluted liquid to be diluted 16-fold, and it is more preferable that adhesive composition 12 is from an undiluted liquid to be diluted 4-fold, by adding the solvent in the mass ratio to an undiluted liquid that is the total of the coupling agent and the crosslinking agent.

Embodiment 2: Seal Structure Body

With reference to FIGS. 1 and 2, a seal structure body 10 that is another embodiment of the present invention includes metallic support 11, fluorine-based elastomer 13, and adhesive composition 12 of the embodiment 1 that causes fluorine-based elastomer 13 to adhere to metallic support 11. Seal structure body 10 of the present embodiment can be obtained at low cost and has high adhesive strength as well as high heat resistance and plasma resistance, since metallic support 11 and fluorine-based elastomer 13 are adhered to each other by adhesive composition 12 of the embodiment 1.

In seal structure body 10 of the present embodiment, as shown in FIG. 1, adhesive composition 12 may be disposed on a flat principal surface of metallic support 11 such that fluorine-based elastomer 13 adheres to metallic support 11 by adhesive composition 12 interposed between metallic support 11 and fluorine-based elastomer 13. In addition, as shown in FIG. 2, adhesive composition 12 may be disposed on a groove 11c formed on a principal surface of metallic support 11 such that fluorine-based elastomer 13 adheres to metallic support 11 by adhesive composition 12 interposed between metallic support 11 and fluorine-based elastomer 13.

(Metallic Support)

Metallic support 11 included in seal structure body 10 of the present embodiment is not particularly limited as long as it can retain fluorine-based elastomer 13 that is a seal material and has high heat resistance and plasma resistance, and suitable examples of metallic support 11 include an aluminum support, a stainless support and the like. Meanwhile, the shape of metallic support 11 is not particularly limited, and the shape may be a plate shape as shown in FIGS. 1 and 2 and may be any of other shapes.

(Fluorine-Based Elastomer)

Fluorine-based elastomer 13 that is a seal material included in seal structure body 10 of the present embodiment is not particularly limited, and examples of fluorine-based elastomer 13 include the above-described VDF-HFP copolymerized elastomer, the VDF-HFP-TFE copolymerized elastomer, the VDF-TFE-PMVE copolymerized elastomer, the TFE-PP copolymerized elastomer, the TFE-PAVE copolymerized elastomer and the like.

In addition, fluorine-based elastomer 13 to which adhesive composition 12 of the present embodiment is used is preferably the TFE-PAVE copolymerized elastomer from the viewpoint of having excellent heat resistance and plasma resistance.

Further, it is preferable that the perfluoroelastomer included in seal structure body 10 of the present embodiment has a nitrile group (CN group), a halogen group (for example, a bromo (Br) group, a iodo (I) group and the like) and the like as a crosslinking site, and it is more preferable that the perfluoroelastomer has a nitrile group as a crosslinking site, from the viewpoint of having high adhesion strength with metallic support 11. The perfluoroelastomer having a nitrile group as a crosslinking site forms an oxazole crosslink, a thiazole crosslink and an imidazole crosslink with a crosslinking agent of an oxazole crosslinking system, that of a thiazole crosslinking system and that of an imidazole crosslinking system, respectively, and is capable of forming a strong covalent bond with the crosslinking agent.

Here, specific examples of the perfluoroelastomer containing a nitrile group as the crosslinking site include a perfluoroelastomer composed of TFE, PAVE and NPM.

In addition, in order to enhance processability or to adjust physical properties, fluorine-based elastomer 13 may further include, as necessary, an additive such as an age resister, an antioxidant, a vulcanizing accelerator, a processing aid (such as stearic acid), a stabilizer, a tackifier, a silane coupling agent, a plasticizer, a flame retardant, a surface lubricant, a wax and a lubricant. Only one kind of the additive or two or more kinds of the additives may be used. Further, as necessary, fluorine-based elastomer 13 may include a filler such as a fluorocarbon resin, carbon black, silica, alumina, zinc oxide, titanium oxide, clay, talc, diatomaceous earth, barium sulfate, calcium carbonate, calcium oxide, mica, graphite, aluminum hydroxide, aluminum silicate, hydrotalcite, metal powder, glass powder and ceramic powder. However, for semiconductor device applications, such a filler may become particles and there is a possibility that yield of a semiconductor device may decrease, and therefore, it is preferable that fluorine-based elastomer 13 does not contain such a filler as far as possible.

Meanwhile, the shape of fluorine-based elastomer 13 that is a seal material is not particularly limited, and the shape may be a ring shape having a semicircular cross section as shown in FIGS. 1 and 2, and may be any of other shapes.

(Adhesive Composition)

Adhesive composition 12 included in seal structure body 10 of the present embodiment contains the coupling agent and the crosslinking agent of the embodiment 1 in the same manner as adhesive composition 12 of the embodiment 1. Here, they are not described repeatedly.

In seal structure body 10 of the present embodiment, adhesive composition 12 causes fluorine-based elastomer 13 to adhere to metallic support 11. The first functional group of the coupling agent contained in adhesive composition 12 reacts with and binds to metallic support 11 that is an inorganic material, and the second functional group of the coupling agent contained in adhesive composition 12 reacts with and binds to fluorine-based elastomer 13 that is an organic material. In addition, the crosslinking agent contained in adhesive composition 12 crosslinks with the crosslinking site of fluorine-based elastomer 13 such that the crosslinking agent binds to fluorine-based elastomer 13. In this manner, in seal structure body 10 of the present embodiment, adhesive composition 12 causes fluorine-based elastomer 13 to adhere to metallic support 11 with high adhesive strength.

Embodiment 3: Method for Manufacturing Seal Structure Body

With reference to FIGS. 1 and 2, a method for manufacturing seal structure body 10 that is yet another embodiment of the present invention includes the steps of providing metallic support 11 and fluorine-based elastomer 13, and causing fluorine-based elastomer 13 to adhere to metallic support 11 by using adhesive composition 12 of the embodiment 1. The method for manufacturing seal structure body 10 of the present embodiment makes it possible to manufacture seal structure body 10 having high adhesion strength between metallic support 11 and fluorine-based elastomer 13 at low cost without requiring baking treatment, and makes it possible for adhesive composition 12 to be free from an organometallic compound and to be easy to handle, by causing fluorine-based elastomer 13 to adhere to metallic support 11 by using adhesive composition 12 of the embodiment 1.

(Step of Providing Metallic Support and Fluorine-Based Elastomer)

In the step of providing metallic support 11 and fluorine-based elastomer 13, metallic support 11 and fluorine-based elastomer 13 that are provided are the same as metallic support 11 and fluorine-based elastomer 13 in seal structure body 10 of embodiment 2, respectively, and therefore, they are not described repeatedly.

(Step of Causing Fluorine-Based Elastomer to Adhere to Metallic Support by Using Adhesive Composition)

Adhesive composition 12 used in the step of causing fluorine-based elastomer 13 to adhere to metallic support 11 is the same as adhesive composition 12 of the embodiment 1, and therefore, it is not described here repeatedly. In addition, the step of causing fluorine-based elastomer 13 to adhere to metallic support 11 by using adhesive composition 12 is not particularly limited, but it is preferable that the step includes the substep of applying adhesive composition 12 on metallic support 11, the substep of sticking metallic support 11 on which adhesive composition 12 is applied and fluorine-based elastomer 13 together, and the substep of annealing metallic support 11 on which fluorine-based elastomer 13 is stuck, from the viewpoint of causing fluorine-based elastomer 13 to adhere to metallic support 11 efficiently and with high adhesive strength.

The method for applying adhesive composition 12 on metallic support 11 is not particularly limited, and suitable examples of the method include spray application, brush application, soaking, spin coating and the like. After adhesive composition 12 is applied on metallic support 11, baking is not required, and it is sufficient to dry adhesive composition 12 at room temperature (for example, about 5° C. to 35° C.).

The method for sticking metallic support 11 on which adhesive composition 12 is applied and fluorine-based elastomer 13 together is, for example, a method that includes pressure sticking by applying a pressure of about 1 MPa to 10 MPa at a temperature of about 170° C. to 190° C.

The method for annealing metallic support 11 on which fluorine-based elastomer 13 is stuck is not particularly limited, but it is preferable to heat to higher than or equal to 150° C. and lower than or equal to 220° C., and it is more preferable to heat to higher than or equal to 200° C. and lower than or equal to 220° C., in a vacuum atmosphere or in an air atmosphere, from the viewpoint of enhancing an adhesive property and moldability.

By the above-described annealing substep, the first functional group of the coupling agent contained in adhesive composition 12 reacts with and binds to metallic support 11 that is an inorganic material and the second functional group of the coupling agent contained in adhesive composition 12 reacts with and binds to fluorine-based elastomer 13 that is an organic material. In addition, the crosslinking agent contained in adhesive composition 12 crosslinks with the crosslinking site of fluorine-based elastomer 13 such that the crosslinking agent binds to fluorine-based elastomer 13. In this manner, in seal structure body 10 of the present embodiment, adhesive composition 12 causes fluorine-based elastomer 13 to adhere to metallic support 11 with higher adhesive strength.

EXAMPLES

Example 1

1. Preparation of Adhesive Composition

Metaloc S-7 containing 10 mass % of a silane coupling agent manufactured by TOYOKAGAKU KENKYUSYO CO., LTD, and 0.01 mass % of BOAP (2,2-bis(3-amino-4-hydroxyphenyl)hexafluoropropane) manufactured by Tokyo Chemical Industry Co., Ltd. that is a crosslinking agent based on the mass of Metaloc S-7 were uniformly mixed to prepare an adhesive composition.

2. Manufacture of Seal Structure Body

The above-described adhesive composition was applied on an aluminum plate of 25 mm×60 mm×thickness of 1.5 mm that is a metallic support by brush application, and the plate was dried in an air atmosphere at 20° C. for 20 minutes. Then, FFKM1 of 25 mm×60 mm×thickness of 2.3 mm that is a perfluoroelastomer obtained by kneading 100 mass parts of PFE133TBZ manufactured by Dyneon and 0.5 mass parts of BOAP was disposed as a fluorine-based elastomer on the metallic support on which the adhesive composition had been applied, and the metallic support and the fluorine-based elastomer were stuck together by applying a pressure of 3 MPa at 180° C. Next, the metallic support on which the fluorine-based elastomer was stuck was pressurized and heated in an air atmosphere at 220° C. to cause annealing, and then a seal structure body was obtained.

3. Evaluation of Adhesive Strength of Seal Structure Body

The adhesive strength between the metallic support and the fluorine-based elastomer of each of four seal structure bodies obtained as described above was evaluated according to JIS K6256-2: 2013. That is, after manufacturing the seal structure body, the seal structure body was left to stand in the atmosphere at 25° C. for 1 hour, and thereafter, the peeling strength was measured by using AUTOGRAPH AGS-500B manufactured by Shimadzu Corporation at the time when the unadhered end part of the fluorine-based elastomer was pulled apart at a moving speed of 50 mm/min in the vertical direction relative to the principal surface of the metallic support in the atmosphere at 25° C. The results were summarized in Table 1.

Example 2

An adhesive composition was prepared, seal structure bodies were manufactured and the adhesive strength of each of the seal structure bodies was evaluated in the same manner as Example 1 except that the amount of BOAP that is a crosslinking agent was made to be 0.1 mass % to the mass of Metaloc S-7 in the preparation of the adhesive composition. The results were summarized in Table 1.

Example 3

An adhesive composition was prepared, seal structure bodies were manufactured and the adhesive strength of each of the seal structure bodies was evaluated in the same manner as Example 1 except that the amount of BOAP that is a crosslinking agent was made to be 1 mass % to the mass of Metaloc S-7 in the preparation of the adhesive composition. The results were summarized in Table 1.

Example 4

An adhesive composition was prepared, seal structure bodies were manufactured and the adhesive strength of each of the seal structure bodies was evaluated in the same manner as Example 1 except that the amount of BOAP that is a crosslinking agent was made to be 4 mass % to the mass of Metaloc S-7 in the preparation of the adhesive composition. The results were summarized in Table 1.

Example 5

An adhesive composition was prepared, seal structure bodies were manufactured and the adhesive strength of each of the seal structure bodies was evaluated in the same manner as Example 3 except that FFKM2 that is a perfluoroelastomer of 25 mm×60 mm×thickness of 2.3 mm obtained by kneading 100 mass parts of PFE133TBZ manufactured by Dyneon and 1.0 mass part of PFE300C manufactured by Dyneon was used as a fluorine-based elastomer in the manufacture of seal structure bodies. The results were summarized in Table 1.

Comparative Example 1

An adhesive composition was prepared, seal structure bodies were manufactured, and the adhesive strength of each of the seal structure bodies was evaluated in the same manner as Example 1 except that Metaloc S-7 manufactured by TOYOKAGAKU KENKYUSYO CO., LTD, was used as the adhesive composition.
The results were summarized in Table 1.

Comparative Example 2

An adhesive composition was prepared, seal structure bodies were manufactured and the adhesive strength of each of the seal structure bodies was evaluated in the same manner as Example 1, except that an adhesive component that contains 40 mass % of a bisphenol A/epichlorohydrin copolymer, 10-30 mass % of a phenolic resin, 10-30 mass % of a synthetic rubber, 5-10 mass % of an epoxy resin (CAS number: 28906-96-9), 5-10 mass % of an epoxy resin (CAS number: 25036-25-3), 1-5 mass % of an epoxy sulfone polymer, 1-5 mass % of a nonvolatile amide and 1-5 mass % of dicyandiamide was dissolved in a mixed solvent of 80 mass parts of acetone and 20 mass parts of methanol to prepare an adhesive solution containing 5 mass % of the above-described adhesive component in the preparation of the adhesive composition, and except that the adhesive composition was applied on an A5052 aluminum plate of 25 mm×60 mm×thickness of 1.5 mm that is a metallic support by brush application, and after baking in an air atmosphere at 150° C. for 10 minutes, the metallic support and the fluorine-based elastomer were stuck together and annealing was performed in the manufacture of seal structure bodies. The results were summarized in Table 1.

Comparative Example 3

An adhesive composition was prepared, seal structure bodies were manufactured and the adhesive strength of each of the seal structure bodies was evaluated in the same manner as Comparative Example 1 except that FFKM2 that is a perfluoroelastomer of 25 mm×60 mm×thickness of 2.3 mm obtained by kneading 100 mass parts of PFE133TBZ manufactured by Dyneon and 1.0 mass part of PFE300C manufactured by Dyneon was used as a fluorine-based elastomer in the manufacture of seal structure bodies. The results were summarized in Table 1.

Comparative Example 4

An adhesive composition was prepared, seal structure bodies were manufactured and the adhesive strength of each of the seal structure bodies was evaluated in the same manner as Comparative Example 2 except that FFKM2 that is a perfluoroelastomer of 25 mm×60 mm×thickness of 2.3 mm obtained by kneading 100 mass parts of PFE133TBZ manufactured by Dyneon and 1.0 mass part of PFE300C manufactured by Dyneon was used as a fluorine-based elastomer in the manufacture of seal structure bodies. The results were summarized in Table 1.

TABLE 1

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Adhesive composition Type | S-7 + BOAP 0.01% | S-7 + BOAP 0.1% | S-7 + BOAP 1% | S-7 + BOAP 4% | S-7 + BOAP 1% | S-7 | Epoxy | S-7 | Epoxy |
| Fluorine-based elastomer Type | FFKM1 | FFKM1 | FFKM1 | FFKM1 | FFKM2 | FFKM1 | FFKM1 | FFKM2 | FFKM2 |
| Adhesive strength (N/mm) | 1.30 | 1.29 | 1.50 | 1.36 | 2.68 | 0.76 | 0.86 | 1.94 | 1.56 |
| | 1.27 | 1.20 | 1.35 | 1.27 | 2.55 | 0.84 | 0.84 | 1.60 | 1.21 |
| | 1.36 | 1.19 | 1.44 | 1.24 | 2.79 | 0.83 | 0.91 | 1.85 | 1.69 |
| | 1.22 | 1.31 | 1.39 | 1.19 | 2.48 | 0.93 | 0.95 | 2.00 | 1.33 |
| [Mean] | [1.29] | [1.25] | [1.42] | [1.27] | [2.63] | [0.84] | [0.89] | [1.85] | [1.45] |

With reference to Table 1, from the comparison of Examples 1 to 4 and Comparative Example 1 as well as the comparison of Example 5 and Comparative Example 3, the adhesive strength of the seal structure bodies manufactured by using the adhesive composition of the present embodiment was 1.48 to 1.69-fold and 1.42-fold of the adhesive strength of the seal structure bodies manufactured by using the adhesive composition that contained a silane coupling agent but did not contain a crosslinking agent. In addition, from the comparison of Examples 1 to 4 and Comparative Example 2 as well as the comparison of Example 5 and Comparative Example 4, the adhesive strength of the seal structure bodies manufactured by using the adhesive composition of the present embodiment was 1.40 to 1.60-fold and 1.81-fold of the adhesive strength of the seal structure bodies manufactured by using the adhesive composition that contained an epoxy resin. As described above, it was found that the adhesive strength of the seal structure bodies manufactured by using the adhesive composition of the present embodiment is high adhesive strength that is greater than or equal to 1.40-fold of the adhesive strength of the seal structure bodies manufactured by using the adhesive composition that contained a silane coupling agent but did not contain a crosslinking agent or the seal structure bodies manufactured by using the adhesive composition that contained an epoxy resin.

It should be considered that the embodiments and Examples herein disclosed are illustrative but not limitative in all respects. The scope of the present invention is defined by claims but not by the above description, and it is intended that all modifications that are equivalent in terms of the meanings and the scope of claims are encompassed.

REFERENCE SIGNS LIST

10: Seal structure body, 11: Metallic support, 11c: Groove, 12: Adhesive composition, 13: Fluorine-based elastomer.

The invention claimed is:

1. An adhesive composition consisting essentially of a coupling agent, the coupling agent comprising a compound having a first functional group that reacts with an inorganic material and a second functional group that reacts with an organic material, a crosslinking agent capable of crosslinking with a crosslinking site of a fluorine-based elastomer, and a solvent or solvents,
   wherein the second functional group is one selected from the group consisting of a vinyl group, a styryl group, a methacrylic group, an acrylic group, an amino group, a ureido group, an isocyanate group, an isocyanurate group, a mercapto group, and a sulfide group, and
   said crosslinking agent is a crosslinking agent of at least one system of an oxazole crosslinking system, a thiazole crosslinking system and an imidazole crosslinking system.

2. The adhesive composition according to claim 1, wherein said compound of said coupling agent further has a silicon atom and said coupling agent is a silane coupling agent.

3. The adhesive composition according to claim 1, wherein said crosslinking agent is greater than or equal to 0.1 mass parts and less than or equal to 50 mass part to 100 mass parts of the coupling agent.

4. The adhesive composition according to claim 1, wherein said fluorine-based elastomer is a perfluoroelastomer.

5. The adhesive composition according to claim 4, wherein said perfluoroelastomer contains a nitrile group as the crosslinking site.

6. A seal structure body comprising a metallic support, a fluorine-based elastomer and the adhesive composition according to claim 1 that causes said fluorine-based elastomer to adhere to said metallic support.

7. A method for manufacturing a seal structure body comprising the steps of:
   providing a metallic support and a fluorine-based elastomer; and
   causing said fluorine-based elastomer to adhere to said metallic support by using the adhesive composition according to claim 1.

* * * * *